US012724844B2

(12) United States Patent
Cheon et al.

(10) Patent No.: US 12,724,844 B2
(45) Date of Patent: Sep. 1, 2026

(54) CALCULATION VERIFICATION FOR APPROXIMATE CALCULATION

(71) Applicant: Crypto Lab Inc., Seoul (KR)

(72) Inventors: Jung Hee Cheon, Seoul (KR); Dongwoo Kim, Seoul (KR); Daejun Park, Seoul (KR)

(73) Assignee: Crypto Lab Inc., Seoul (KR)

( * ) Notice: Subject to any disclaimer, the term of this patent is extended or adjusted under 35 U.S.C. 154(b) by 1070 days.

(21) Appl. No.: 17/422,278

(22) PCT Filed: Jan. 10, 2020

(86) PCT No.: PCT/KR2020/000534
§ 371 (c)(1),
(2) Date: Jul. 12, 2021

(87) PCT Pub. No.: WO2020/145759
PCT Pub. Date: Jul. 16, 2020

(65) Prior Publication Data

US 2022/0092150 A1 Mar. 24, 2022

Related U.S. Application Data

(60) Provisional application No. 62/791,330, filed on Jan. 11, 2019.

(30) Foreign Application Priority Data

Jan. 9, 2020 (KR) ........................ 10-2020-0003240

(51) Int. Cl.
*G06F 17/11* (2006.01)

(52) U.S. Cl.
CPC .................................... *G06F 17/11* (2013.01)

(58) Field of Classification Search
CPC .......... G06F 17/11; G06F 17/156; H04L 9/00; H04L 9/008; H04L 9/3066; H04L 9/3073;
(Continued)

(56) References Cited

U.S. PATENT DOCUMENTS 6,959,085 B1 * 10/2005 Hoffstein ................ H04L 9/008 713/168
6,978,372 B1 12/2005 Jakobsson
(Continued)

FOREIGN PATENT DOCUMENTS

KR 10-2008-0084500 A 9/2008
KR 10-2011-0009221 A 1/2011
(Continued)

OTHER PUBLICATIONS

Bini, G., Flamini, F. (2002). Galois and Quasi-Galois Rings: Structure and Properties. In: Finite Commutative Rings and Their Applications. The Springer International Series in Engineering and Computer Science, vol. 680. Springer, Boston, MA. https://doi.org/10.1007/978-1-4615-0957-8_6 (Year: 2002).*
(Continued)

*Primary Examiner* — Carlo Waje
(74) *Attorney, Agent, or Firm* — Osha Bergman Watanabe & Burton LLP

(57) ABSTRACT

Disclosed is a method of arithmetic operation. The arithmetic operation includes receiving an input value, generating an output value by reflecting the input value to a preset arithmetic circuit on a finite commutative ring and a first polynomial function to verify the output value, and transferring the generated output value and the first polynomial function to an external device.

17 Claims, 6 Drawing Sheets

(58) Field of Classification Search
CPC ............... H04L 9/3093; H04L 2209/26; H04L 2209/46; H04L 2209/12–127
See application file for complete search history.

(56) References Cited

U.S. PATENT DOCUMENTS

| | | | | |
|---|---|---|---|---|
| 8,255,691 | B2 | 8/2012 | Yi et al. | |
| 8,320,557 | B2 | 11/2012 | Michaels et al. | |
| 9,729,323 | B2 | 8/2017 | Joye et al. | |
| 2006/0080066 | A1 | 4/2006 | Orii et al. | |
| 2015/0215123 | A1* | 7/2015 | Kipnis | H04L 9/08 380/46 |
| 2017/0317831 | A1* | 11/2017 | Keuffer | H04L 9/3231 |
| 2018/0083780 | A1* | 3/2018 | Alesiani | H04L 9/0816 |
| 2019/0334695 | A1* | 10/2019 | Veeningen | H04L 9/0825 |

FOREIGN PATENT DOCUMENTS

| | | | |
|---|---|---|---|
| KR | 10-2013-0060636 | A | 6/2013 |
| KR | 101475747 | B1 | 12/2014 |
| KR | 10-2015-0103644 | A | 9/2015 |

OTHER PUBLICATIONS

Office Action issued in corresponding Korean Patent Application No. 10-2020-0003240 dated Sep. 29, 2021 (11 pages).
International Search Report issued in International Application No. PCT/KR2020/000534, mailed on Apr. 17, 2020 (2 pages).
Written Opinion issued in International Application No. PCT/KR2020/000534, mailed on Apr. 17, 2020 (9 pages).
Office Action issued in corresponding Korean Patent Application No. 10-2020-0003240, mailed on Feb. 23, 2021 (11 pages).

* cited by examiner

CALCULATION VERIFICATION FOR APPROXIMATE CALCULATION

TECHNICAL FIELD

This disclosure relates to verifiable computing for approximate computation and, more particularly, to a method for performing verifiable computing for approximate computation that is performed by another device, and an apparatus thereof.

BACKGROUND ART

With the development of cloud computing technology, a situation in which data and computation of data are assigned to a third party is increasing. However, if the computation is assigned to the third party, there is a problem in that the same computation must be directly performed in order to confirm that a result of the computation is correct.

In order to solve this problem, verifiable computing has been recently developed in the field of computational theory and encryption. The verifiable computing is a technology of requesting arbitrary computation (or computation circuit) to a high performance device, and, if the high performance device performs an arithmetic operation, verifies the accuracy of the result of the performed arithmetic operation.

Using the verifiable computing, it is possible to generate verification for the result by a party assigned with computation, and a party to verify the accuracy of the computation may determine the accuracy of the computation result through the verification while consuming only a smaller amount of computation than directly performing computation.

However, there is a limitation in that the verification efficiency is significantly reduced for approximate computation such as a complex computation, especially a fixed point arithmetic operation, a floating point arithmetic operation, or the like.

DISCLOSURE

Technical Problem

It is an object of the disclosure to provide verifiable computing for approximate computation capable of performing verifiable computing for approximate computation performed by another device.

Technical Solution

A method of arithmetic operation includes receiving an input value, generating an output value by reflecting the input value to a preset arithmetic circuit on a finite commutative ring and a first polynomial function to verify the output value, and transferring the generated output value and the first polynomial function to an external device.

Each of the input value and the output value may be a homomorphic ciphertext.

The method may further include receiving a random value randomly extracted from the finite commutative ring, generating a computation value for the random value and a second polynomial function to verify the computation value, and transferring the generated computation value and the second polynomial to the external device.

The finite commutative ring may be a Galois ring.

Each of the generating the first polynomial function and the second polynomial function may include generating a polynomial function by using an n-variable polynomial.

The arithmetic circuit may be composed of a plurality of layers, and each layer may include at least one of an addition gate or a multiplication gate.

The arithmetic circuit may include a modular arithmetic operation, a polynomial operation to make a lower bit to zero, and a round-off operation using a division operation.

A method of calculation verification according to an embodiment includes transferring an input value to an external device, receiving an operation result generated by reflecting the input value to a preset arithmetic circuit on a finite commutative ring and a polynomial function, performing a verification operation using the received polynomial function, and verifying the arithmetic operation by the external device using the verified operation result and the received arithmetic operation result.

The method may further include extracting a random value from a finite commutative ring and transferring the extracted random value to the external device.

The extracting may include extracting a random value from a set which is a subset of the finite commutative ring and in which a difference between two different numbers is not a zero divisor.

The finite commutative ring may be a Galois ring.

The method may further include receiving a polynomial function corresponding to the transferred random value, and the verifying may include verifying the arithmetic operation by the external device by also using a polynomial function corresponding to the random value.

An computation apparatus according to an embodiment includes a communication device to receive an input value, a memory storing at least one instruction, and a processor to execute the at least one instruction, and the processor, by performing the at least one instruction, may generate an output value by reflecting the input value to a preset arithmetic circuit on a finite commutative ring and a first polynomial function to verify the output value, and control the communication device to transfer the generated output value and the first polynomial function to an external device.

The processor may, based on receiving, from the external device, a random value extracted from the finite commutative ring, generate a computation value for the random value and a second polynomial function to verify the computation value, and control the communication device to transfer the generated computation value and the second polynomial to the external device.

The processor may generate the first polynomial function and the second polynomial function by using n-variable polynomial, and perform a verifiable computing operation as many as times corresponding to a number of variables of the n-variable polynomial.

The arithmetic circuit may be composed of a plurality of layers, and each layer may include at least one of an addition gate or a multiplication gate.

The arithmetic circuit may include a modular arithmetic operation, a polynomial operation to make a lower bit to zero, and a round-off operation using a division operation.

Each of the input value and the output value may be a homomorphic ciphertext.

According to an embodiment, an computation apparatus includes a communication device to communicate with an external device, a memory storing at least one instruction, and a processor to execute the at least one instruction, and the processor, by performing the at least one instruction, may control the communication device to transfer an input value to an external device, based on receiving an computation result generated by reflecting the input value to a preset arithmetic circuit on a finite commutative ring and a polynomial, perform verified operation using the received polynomial, and verify arithmetic operation by the external device using the verified operation result and the received arithmetic operation result.

The processor may extract a random value from the finite commutative ring and control the communication device to transfer the extracted random value to the external device.

Effect of Invention

According to various embodiments as described above, especially for approximate computation such as a fixed point computation, a floating point computation, or the like, it is possible to perform efficient computation and verification.

BEST MODE

Mode for Carrying out the Invention

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector and a polynomial.

The mathematical operation and computation of each step of the disclosure described hereinafter may be realized by a computer operation by a coding method known for corresponding operation or computation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.

$a \leftarrow D$: element (a) is selected according to distribution (D)

$s_1, s_2 \in R$: S1 and S2 are each an element belonging to R set.

mod (q): Modular operation with q elements $\lceil \cdot \rfloor$: internal value is round off Hereinafter, various embodiments of the disclosure will be described in detail with reference to the accompanying drawings.

Figure 1:
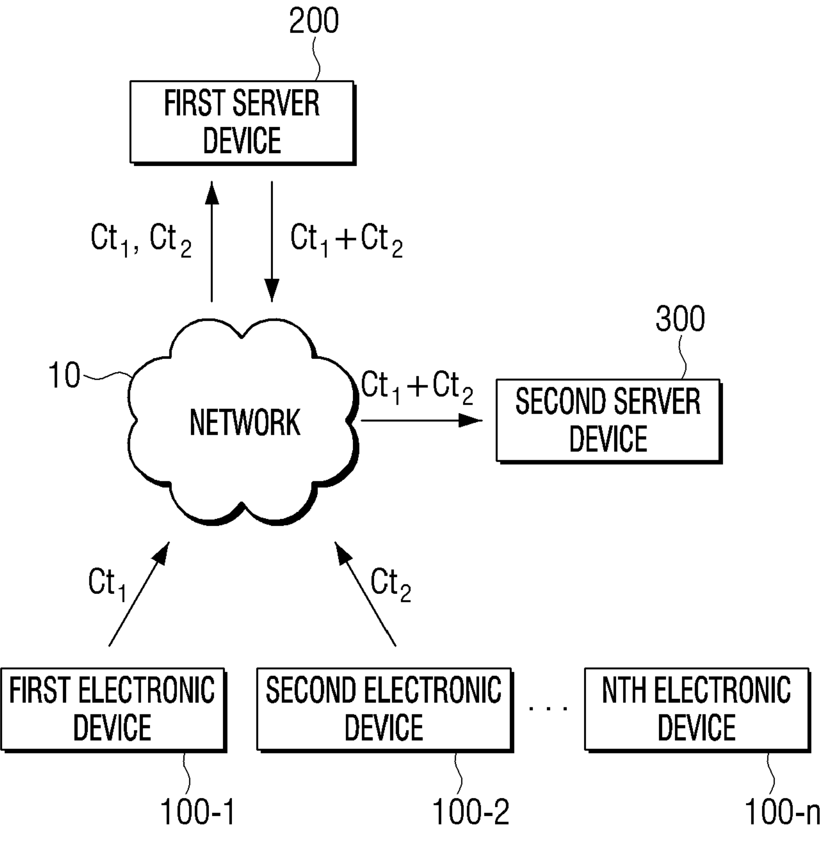
FIG. 1 is a view illustrating a structure of a network system according to an embodiment of the disclosure.

FIG. 1 is a view illustrating a structure of a network system according to an embodiment of the disclosure.

Referring to FIG. 1, a network system may include a plurality of electronic apparatuses 100-1 to **100-*n*, a first server device 200, and a second server device 300, and the components each may be connected to each other via a network 10**.

The network 10 may be implemented in various types of wired/wireless communication networks, broadcast communication networks, optical communication networks, cloud networks, and the like, and each device may also be connected by a method such as Wi-Fi, Bluetooth, and near field communication (NFC), and the like, without a separate medium.

In FIG. 1, a plurality of electronic apparatuses 100-1 to **100-*n* are illustrated but the plurality of electronic apparatuses may not necessarily be used and one device may be used. For example, the electronic apparatuses 100-1 to 100-*n*** may be implemented in various types of devices such as smartphones, tablets, game players, PCs, laptop PCs, home servers, kiosks, and the like, and may also be implemented in the form of a home appliance to which an IoT function is applied.

The user may input various information through the electronic apparatuses 100-1 to **100-*n* which the user is using. The input information may be stored in the electronic apparatuses 100-1 to 100-*n*, but may be transferred to an external device due to the reason of storage capacity, security, or the like. Referring to FIG. 1, a first server device 200 may function to store the information, and a second server device 300 may function to use some or all of the information stored in the first server device 200**.

Each of the electronic apparatuses 100-1 to **100-*n* may homomorphically encrypt the input information, and transfer a homomorphic ciphertext to the first server device 200**.

Each of the electronic apparatuses 100-1 to **100-*n* may include encryption noise calculated in the process of performing the homomorphic encryption, i.e., an error, in the ciphertext. For example, the homomorphic ciphertext generated by each of the electronic apparatuses 100-1 to 100-*n*** may be generated in a form in which a resultant value including a message and an error value is restored, when decrypted later using a secret key.

For example, the homomorphic ciphertext generated by the electronic apparatuses 100-1 to **100-*n*** may be generated in a form satisfying the following properties when decrypted using a secret key.

$$Dec(ct,sk)=\langle ct,sk\rangle=M+e(\mathrm{mod}\,q) \quad \text{[Equation 1]}$$

Here, <, > is a usual inner product, ct is a ciphertext, sk is secret key, M is plaintext message, e is an encryption error value, and mod q is Modulus of the ciphertext. Here, q should be chosen to be greater than a resultant value M obtained by multiplying the message by a scaling factor Δ. If an absolute value of the error value e is smaller enough than M, then a decrypted value M+e of the ciphertext is a value that may replace an original message with the same precision in significant digit arithmetic operation. Among the decrypted data, an error may be disposed on the least significant bit (LSB) side and M may be disposed on a second LSB side.

If a size of the message is too small or too large, the size of the message may be adjusted using a scaling factor. When the scaling factor is used, even a message in the form of a real number, as well as the form of an integer, may be encrypted, utilization may be significantly increased. In addition, by adjusting the size of the message using the scaling factor, a size of an area in which the messages exist, that is, an effective area, in the ciphertext after the arithmetic operation is performed may also be adjusted.

According to an embodiment, the ciphertext modulus q may be set and used in various forms. For example, the modulus of the ciphertext may be set in the form of an exponential power $q=66^{L}$ of the scaling factor Δ. If Δ is 2, q may be set to a value such as $q=2^{10}$. Alternatively, q may be represented by a combination of two exponents satisfying a predetermined condition.

As another example, the ciphertext modulus may be set to a value multiplied by a plurality of different scaling factors. Each of the factors may be set to a value within a similar range, that is, a value of a similar size. For example, the factor may be set to $q=q_1 q_2 q_3 \ldots q_x$, each of which may have the similar size with the scaling factor A and may be set to a value of a coprime.

Each of the electronic apparatuses 100-1 to **100-*n* may generate a plurality of information as a single homomorphic ciphertext. For example, the electronic apparatus 100 may store various information such as GPS information, user ID information, gender information, etc., and the electronic apparatus 100** may pack various information as described above to generate a single homomorphic ciphertext. The packing operation will be described later.

The first server device 200 may store the received homomorphic ciphertext in the ciphertext form, without decrypting the received homomorphic ciphertext.

The second server device 300 may request a specific processing result for the homomorphic ciphertext from the first server device 200. The first server device 200 may perform a specific arithmetic operation according to a request from the second server device 300, and then transfer a result to the second server device 300.

For example, when the ciphertexts ct1 and ct2 transferred from the two electronic apparatuses 100-1 and 100-2 are stored in the first server device 200, the second server device 300 may request the computation on the predetermined arithmetic circuit for the information provided from the electronic apparatuses 100-1 and 100-2, to the first server device 200.

The arithmetic circuit may be an arithmetic operation circuit configured with subtraction and multiplication, and as an arithmetic operation circuit for approximate computation. The above-described arithmetic circuit may be a circuit having a plurality of arithmetic operation layers including at least one of an addition and a multiplication gate in plural. The arithmetic circuit according to the disclosure will be described later with reference to FIG. 4.

The first server device 200 may perform an arithmetic operation using the corresponding arithmetic circuit according to the request, and may transfer the result to the second server device 300. The first server device 200 may generate a polynomial function for verifying the arithmetic operation described above, and may transfer the generated polynomial function to the second server device 300 together with the computation result described above. This operation is referred to as verifiable computing, and the first server device 200 described above may operate as a prover, and the second server device 300 may operate as a verifier. A more specific verifiable computing operation will be described below with reference to FIG. 3.

Meanwhile, although FIG. 1 illustrates a case that the first electronic apparatus and the second electronic apparatus perform encryption and the second server device performs decryption, the disclosure is not limited thereto.

Figure 2:
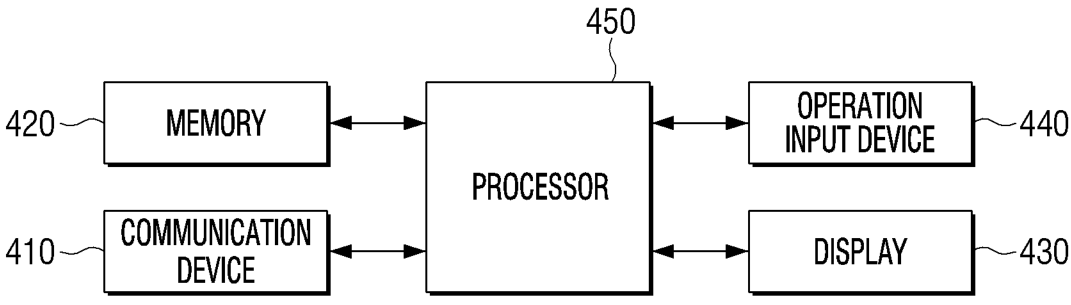
FIG. 2 is a block diagram illustrating a configuration of an computation apparatus according to an embodiment of the disclosure.

FIG. 2 is a block diagram illustrating a configuration of a computation apparatus according to an embodiment of the disclosure.

For example, in the system of FIG. 1, the devices that perform homomorphic encryption, such as the first electronic apparatus and the second electronic apparatus, the device that arithmetically operates the homomorphic ciphertext, such as the first server device or the like, the device that decrypts the homomorphic ciphertext, such as the second server device, and the like, may be referred to as computation apparatuses. The computation apparatuses may include various devices such as a personal computer, a notebook computer, a smartphone, a tablet, a server, and the like. The computation apparatus may be a device that performs a function of a prover as in FIG. 3 which will be described later, or may be a device that performs a function of the verifier.

Referring to FIG. 2, the computation apparatus 400 may include a communication device 410, a memory 420, a display 430, an operation input device 440, and a processor 450.

The communication device 410 is provided to connect the computation apparatus 400 to an external device (not shown), and here, the communication device 410 may be connected to an external device via a local area network (LAN) and the internet or may be connected to the external device through a universal serial bus (USB) port or a wireless communication (e.g., Wi-Fi 802.11a/b/g/n, NFC, Bluetooth) port. The communication device 410 may also be referred to as a transceiver.

The communication device 410 may receive a public key from an external device and transfer a public key generated by the computation apparatus 400 itself to the external device.

The communication device 410 may receive a message from an external device and transfer a generated homomorphic ciphertext to the external device.

In addition, the communication device 410 may receive various parameters necessary for generating a ciphertext from an external device. Meanwhile, in the implementation, various parameters may be directly input from the user through the operation input device 440 to be described later.

In addition, the communication device 410 may receive a request for an arithmetic operation on the homomorphic ciphertext from the external device and transfer a calculated result to the external device. The requested arithmetic operation may be, for example, arithmetic operation such as addition, subtraction, multiplication (e.g., a modular multiplication operation), and may be an arithmetic operation using a predetermined arithmetic circuit. The communication device 410 may receive a request for an arithmetic operation for a real number input value, such as a fixed point, as well as an arithmetic operation for the homomorphic ciphertext.

The communication device 410 may transfer a computation result to the external device. If the computation apparatus 400 operates as a prover, the communication device 410 may transfer a polynomial function for verifying the corresponding computation result together with the computation result to the external device. The polynomial function is a function used for verification using a sum-check protocol, and may be an n-variable polynomial. The specific operation of the sum-check protocol will be described later.

If the computation apparatus 400 operates as a verifier, the communication device 410 may transfer the homomorphic ciphertext to be used in the arithmetic operation, transfer a random value, receive a computation result for the transferred homomorphic ciphertext, or receive a computation result and a polynomial function for the random value.

The communication device 410 may receive an arithmetic circuit. The arithmetic circuit may be received with an arithmetic operation request from a device requesting the arithmetic operation using the arithmetic circuit, and may be previously received and stored in the memory 420, which will be described later.

At least one instruction regarding the computation apparatus 400 may be stored in the memory 420. For example, various programs (or software) for the computation apparatus 400 to operate may be stored in the memory 420 according to various embodiments of the disclosure.

The memory 420 may be implemented in various forms such as a random access memory (RAM), a read-only memory (ROM), a flash memory, a hard disk drive (HDD), an external memory, a memory card, and the like, but is not limited thereto.

The memory 420 may store a message to be encrypted. Here, the message may be various credit information, personal information, and the like quoted by the user or may be information related to a usage history such as location information and Internet usage time information used in the computation apparatus 400.

The memory 420 may store a public key. If the computation apparatus 400 is a device that directly generates a public key, the memory 420 may store various parameters necessary for generating a public key and a secret key, as well as the secret key.

In addition, the memory 420 may store a homomorphic ciphertext generated in a process to be described later. The memory 420 may store a homomorphic ciphertext transferred from an external device. In addition, the memory 420 may store a computation result ciphertext which is a result of the arithmetic operation as described later.

The memory 420 may store the arithmetic circuit to be used for the arithmetic operation.

The display 430 displays a user interface window for selecting a function supported by the computation apparatus 400. For example, the display 430 may display a user interface window for selecting various functions provided by the computation apparatus 400. The display 430 may be a monitor such as a liquid crystal display (LCD), an organic light emitting diode (OLED), or the like or may be implemented as a touch screen capable of simultaneously performing a function of the operation input device 440 to be described later.

The display 430 may display a message requesting input of a parameter required for generating a secret key and a public key. Meanwhile, when implemented, the encryption target may be directly selected by the user or may be automatically selected. That is, personal information requiring encryption may be automatically set even if the user does not directly select a message.

The operation input device 440 may receive selection of a function of the computation apparatus 400 and a control command for the corresponding function from the user. For example, the operation input device 440 may receive a parameter required for generating a secret key and a public key from the user. In addition, the operation input device 440 may receive a message to be encrypted from the user.

The processor 450 controls an overall operation of the computation apparatus 400. For example, the processor 450 may control the overall operation of the computation apparatus 400 by executing at least one instruction stored in the memory 420. The processor 450 may be configured as a single device such as a central processing unit (CPU) or an application-specific integrated circuit (ASIC) or may include a plurality of devices such as the CPU and a graphics processing unit (GPU).

When a message to be transferred is input, the processor 450 may store the message in the memory 420. The processor 450 may homomorphically encrypt the message using various set values and programs stored in the memory 420. In this case, the public key may be used.

The processor 450 may generate a public key required for performing encryption by itself and use the public key or may receive the public key from an external device and use the same. For example, the second server device 300 that performs decryption may distribute the public key to other devices.

When generating a key by itself, the processor 450 may generate the public key using a Ring-LWE technique. For example, the processor 450 may first set various parameters and rings and store the set parameters and rings in the memory 420. Examples of parameters may include a length of bits of a plain text, sizes of the public key and the secret key, and the like.

The ring may be expressed by the following equation.

$$R = \mathbb{Z}_q[x]/(f(x)) \quad \text{[Equation 2]}$$

Here, R denotes a ring, Zq denotes a coefficient, and f(x) is a $n^{th}$ order polynomial.

The ring, as a set of polynomials with predetermined coefficients, refers to set in which addition and multiplication are defined between elements and which is closed for addition and multiplication. Such a ring may be referred to as a ring.

As an example, the ring refers to a set of N-th polynomials whose coefficient is Zq. For example, the ring may refer to N-th cyclotomic polynomial when n is Φ(N). Here, (f(x)) denotes an ideal of Zq[x] produced by (x). The Euler's totient function Φ(N) refers to the number of natural numbers which are relatively prime with N and smaller than N. If $\Phi_N(x)$ is defined as the N-th cyclotomic polynomial, the ring may also be expressed as Equation 3 below.

$$R = \mathbb{Z}_q[x]/(\Phi_N(x)) \quad \text{[Equation 3]}$$

Meanwhile, the ring of Equation 3 described above may have a complex number in a plain text space. Meanwhile, in order to improve an arithmetic operation speed for the homomorphic ciphertext, only a set in which the plain text space is a real number, in the set of the ring described above, may also be used.

The ring described above may be a finite field which is an algebraic object in which all the elements have an inverse for multiplication, and may be finite commutative ring. The finite commutative ring will be described later.

When such a ring is established, the processor 450 may calculate a secret key sk from the ring.

$$sk \leftarrow (1, s(x)), s(x) \in R \quad \text{[Equation 4]}$$

Here, s(x) denotes a polynomial generated randomly with a small coefficient.

The processor 450 may calculate a first random polynomial a(x) from the ring. The first random polynomial may be expressed as follows.

$$a(x) \leftarrow R \quad \text{[Equation 5]}$$

In addition, the processor 450 may calculate an error. For example, the processor 450 may extract an error from a discrete Gaussian distribution or a distribution having a statistical distance close thereto. This error may be expressed as follows.

$$e(x) \leftarrow D^n_{\alpha q} \quad \text{[Equation 6]}$$

When the error is calculated, the processor 450 may calculate a second random polynomial by performing a modular operation on the first random polynomial and the secret key error. The second random polynomial may be expressed as follows.

$$b(x) = -a(x)s(x) + e(x) \pmod q \quad \text{[Equation 7]}$$

Finally, the public key pk may be set in a form including the first random polynomial and the second random polynomial as follows.

$$\text{pk} = (b(x), a(x)) \quad \text{[Equation 8]}$$

The method of generating the key described above is merely an example, and thus the disclosure is not limited there and the public key and the secret key may be generated in other ways.

When the public key is generated, the processor 450 may control the communication device 410 to transfer the public key to other devices.

The processor 450 may generate a homomorphic ciphertext for a message. For example, the processor 450 may generate the homomorphic ciphertext by applying the previously generated public key to the message.

A message to be decrypted may be received from an external source or may be input from an input device directly coupled or connected to the computation apparatus 400. For example, when the computation apparatus 400 includes a touch screen or a key pad, the processor 450 may store data input through the touch screen or the key pad in the memory 420, and then encrypt the data. The generated homomorphic ciphertext may be restored to a result value obtained by adding an error to a value reflecting the scaling factor in the message when the code is decrypted.

When the homomorphic ciphertext is generated, the processor 450 may control the communication device 410 to store the generated ciphertext in the memory 420 or transfer the ciphertext to another device according to a user request or a predetermined default command.

The packing may be performed during encryption. Here, the packing may refer to generating a plurality of messages as one ciphertext.

The use of packing in homomorphic encryption makes it possible to encrypt multiple messages in a single ciphertext. In this case, when an arithmetic operation is performed between the ciphertexts in the computation apparatus 400, an arithmetic operation burden is significantly reduced because the arithmetic operation is performed on a plurality of messages in parallel.

For example, when a message includes a plurality of message vectors, the processor 450 may convert the plurality of message vectors into a polynomial that may be encrypted in parallel.

Then, the processor 450 may multiply the polynomial by a scaling factor, and perform homomorphic encryption thereon using a public key.

When the homomorphic ciphertext is required to be decrypted, the processor 450 may generate a polynomial deciphertext by applying a secret key to the homomorphic ciphertext and generate a message by decoding the polynomial deciphertext. Here, the generated message may include an error as mentioned in Equation 1 described above.

The processor 450 may perform an arithmetic operation on the ciphertext. For example, the processor 450 may perform an arithmetic operation such as addition, subtraction, or multiplication, while maintaining the encrypted state regarding the homomorphic ciphertext.

If the requested arithmetic operation is complicated, the processor 450 may transfer the homomorphic ciphertext to an external device to request that the external device performs arithmetic operation instead.

In this example, the processor 450 may control the communication device 410 to transfer the homomorphic ciphertext to the external device. In response to the above-described transmission, if the computation result and a polynomial function are received, the processor 450 may perform verifiable computing using the received polynomial function and the received arithmetic operation result.

If the computation apparatus 400 operates as a prover, the processor 450 may generate the output homomorphic ciphertext and the polynomial function for the output homomorphic ciphertext by reflecting the homomorphic ciphertext to the arithmetic circuit when the homomorphic ciphertext is received from the external device. The processor 450 may control the communication device 410 to transfer the generated output homomorphic ciphertext and the polynomial function to the external device requesting the arithmetic operation.

Meanwhile, when the arithmetic operation is completed, the computation apparatus 400 may detect data of a valid area from computation result data. For example, the computation apparatus 400 may perform a rounding process on the computation result data to detect data of a valid area.

Here, the rounding process refers to round-off of a message in an encrypted state. Alternatively, the rounding process may also be referred to as rescaling. For example, the computation apparatus 400 may multiply the components of each of the ciphertexts by Δ-1, which is the inverse of the scaling factor, and round off, thereby removing the noise area. The noise area may be determined to correspond to the size of the scaling factor. As a result, a message of an effective area excluding the noise area may be detected. The process is proceeded in the encryption state and an additional error may occur, but it is negligible since the size is sufficiently small.

In addition, when a portion of an approximate message in the ciphertext exceeds a threshold according to the arithmetic operation result, the computation apparatus 400 may extend a plain text space of the ciphertext as the result of arithmetic operation. For example, if q is smaller than M in Equation 1 described above, M+e (mod q) has a value different from M+e so that decryption is impossible. Thus, the q value should always be maintained greater than M. However, as the arithmetic operation proceeds, the q value gradually decreases. The expansion of the plaintext space means changing the ciphertext ct to a ciphertext having a greater modulus. The operation of expanding the plaintext space may alternatively be referred to as rebooting. As the rebooting is performed, the ciphertext may be in a stage that arithmetic operation is possible again.

Hereinafter, the verifiable computing operation according to the disclosure will be described in detail. The verifiable computing operation may be participated by the prover and the verifier, the prover may perform computation and verification for a given arithmetic circuit, and the verifier may perform verification about whether the result is accurate based on the computation result value and the proving.

The verifiable computing operation may use the sum-check protocol, which will be described below.

$$\sum_{X_1\in\{0,1\}}\sum_{X_2\in\{0,1\}}\cdots\sum_{X_n\{0,1\}} f(X_1, X_2, \ldots, X_n) \quad \text{[Equation 9]}$$

Here, $f(x_1, x_2, \ldots, x_n)$ is n-variable polynomial.

The sum-check protocol may be performed by information exchange (or round) by n times between the prover and the verifier.

During the first information exchange, the prover may generate the sum computation result S and the first polynomial function as shown below, and transfer to the verifier.

$$f_1(t) := \sum_{(X_2,X_3,\ldots,X_n)\in\{0,1\}^{n-1}} f(t, X_2X_3 \ldots, X_n) \quad \text{[Equation 10]}$$

The verifier which receives the sum computation result S and the first polynomial function may identify that $S=f_1(0)+f_1(1)$ using the received first polynomial function.

If the received sum computation result is different from the aforementioned arithmetic operation result, it may be determined that the arithmetic operation by the prover is not correct.

If the received sum computation result is the same as the aforementioned arithmetic operation result, the next round may be proceeded as shown below. For example, the $i^{th}$ round ($2\le i\le n$) may be proceeded as shown below.

The verifier may deliver the number LA randomly detected on the finite field to the prover. Here, the finite field ($\mathbb{F}$) may be an algebraic object in which all the elements have an inverse for multiplication, and may include, for example, $\mathbb{Z}_p := \mathbb{Z}/p\mathbb{Z}$, the modular arithmetic field for the prime number p.

The prover which receives a random value may generate the polynomial function as below and transfer the function to the verifier.

$$f_i(t) := \sum_{(x_{i+1},\ldots,x_n)\in\{0,1\}^{n-1}} f(r_1, \ldots, r_{i-1}, t, x_{i+1}, \ldots, x_n). \quad \text{[Equation 11]}$$

Here, i refers to the number of rounds and $f_i(t)$ refers to $i^{th}$ polynomial function.

Here, the verifier which received the $i^{th}$ polynomial function (or the second polynomial function) may identify $f_{i-1}(r_{i-1})=f_i(0)+f_1(1)$ using the received $i^{th}$ polynomial function.

If the received sum computation result and the computation result are different, it may be determined that the arithmetic operation by the prover is not correct.

If the received sum computation results and the above-described arithmetic operation results are the same, the above-described operation may be repeated by the number of variables of the n-variable polynomial, and in the last step, f_n (r_n)=f (r_1, r_2, . . . , r_n) may be checked. If the verification process at the above-described steps is correct, it may be determined that the computation of the prover is correct.

The prover cost, the verifier cost, and the probability that the determination is not correct (probability that the computation is not correct, but is determined to be correct) are as shown below.

$$P: 0(d2^n)0(f),\ V: 0(dn) + 0(f),\ \text{probability}: 0\left(\frac{nd}{|F|}\right) \quad \text{[Equation 12]}$$

Here, p refers to the cost of prover, v refers to the cost of verifier, and the probability refers to the probability that the arithmetic operation is determined to be correct in the above verification process, but actual arithmetic operation is not correct.

While it has been described that the verifiable computing operation is applied to the computation of the homomorphic ciphertext, but the verifiable computing operation, which will be described later, may also be applied to the arithmetic operation of input values such as various data, for example, fixed points, as well as homomorphic ciphertext.

For example, approximate round-off verifiable computation for fixed point may be performed. For example, computation of 1.23+4.56=5.79/1.23*4.56=5.6088 (the round-off value is 5.61) can be performed on Z/p^eZ (p=101, e=3 or higher) shown below.

$$123+456=579$$

123*456=56088-> (polynomial arithmetic operation of the disclosure)->56055-> (division p=101) ->555

The arithmetic operation by the computation apparatus may be verified by computing '1.23+4.56=5.79'/ '1.23*4.56=5.6088-> (approximate round-off) 5.55' by the verifier.

Through the above process, verification for the approximate computation (especially, fixed point arithmetic operation) is available.

Multilinear extension may be used for the verifiable computing, and this will be described below.

The definition of the multilinear extension is as shown below.

The multilinear extension $\tilde{V}$ for the given function V: $\{0,1\}^m \rightarrow \mathbb{F}$ may be defined as the multi-variable first degree polynomial satisfying the following.

$$\tilde{V}(\vec{X}) = V(\vec{X}) \text{ for all } \vec{X} \in \{0, 1\}^m \quad \text{[Equation 13]}$$

Here, the multilinear extension for each function may be determined uniquely.

The arithmetic circuit may be composed of an addition gate and a multiplication gate, and each gate may receive two inputs and output an arithmetic operation result. The arithmetic circuit may be composed of d layers. Hereinafter, it is assumed that the output of the i+$\mathbf{1}^{th}$ layer is made of an input of the $i^{th}$ layer. The output layer is assumed to be a $0^{th}$ layer and an input layer as a $d^{th}$ layer.

In this case, the multilinear extension $$\tilde{V}i(\vec{x})$$

made from the output values of the gate of the $i^{th}$ layer may be uniquely defined to satisfy the following.

$$\tilde{V}i(\vec{b}) = \text{Output of the } \vec{b}^{th} \text{ gate} \quad \text{[Equation 14]}$$

(Here, $\vec{b} \in \{0,1\}^n$ is understood as n-digit binary.)

In this example, multilinear extension $\tilde{V}(\vec{r})$ for the $i^{th}$ layer and multilinear extension $\tilde{V}^{i+1}(\vec{r})$ for the i+$1^{th}$ layer may satisfy the interaction formula as shown below.

$$\tilde{V}_i(z) = \sum_{(p,q)\in\{0,1\}^{2S_{i+1}}} \left[\tilde{add}(z, p, q)\left(\tilde{V}_{i+1}(p) + \tilde{V}_{i+1}(q)\right) + \tilde{mult}(z, p, q)\left(\tilde{V}_{i+1}(p) + \tilde{V}_{i+1}(q)\right)\right] \quad \text{[Equation 15]}$$

Here, $\widetilde{add}$, $\widetilde{mult}$, or the like, is the multilinear extension function to satisfy the above formula, and computation is possible when the circuit C is given.

By using the foregoing, the computation result of the arithmetic circuit C for the given finite field $\mathbb{F}$ may be verified through the following process.

First, the prover may compute an output Y for the arithmetic operation circuit C proposed by the verifier and the input X, and then transfer the computation result to the verifier.

The verifier may obtain the following equation by calculating the multilinear extension $\tilde{V}_d$made from the output Y in the vector $\vec{r_0}$ consisting of the numbers randomly extracted on the finite field.

$$\tilde{V}_0(\vec{r_0}) = z_0 \quad \text{[Equation 16]}$$

The formula may be obtained by applying the interaction formula between the multilinear extension $\tilde{V}_i(\vec{r})$ and the multilinear extension $\tilde{V}_{i+1}(\vec{r})$ when i=0, and the sum-check protocol described above may be performed on this formula.

Then, the verifier may obtain $\tilde{V}_1(\vec{r_1})$=z1.

When this process is repeated for each layer, the verifier may finally obtain the following equation for multilinear extension $\tilde{V}^d$ in association with the input X.

$$\tilde{V}_d(\vec{r_d}) = z_d \quad \text{[Equation 17]}$$

The verifier may verify whether this formula is true, and the formula may be verified through the multilinear extension made from the input X that is determined by the verifier. If the formula is determined to be true, the verifier may determine that Y which is the result transferred by the prover is correct.

The prover cost, verifier cost, and the probability that the determination is not correct are as shown below.

$$P: 0(S)V: 0(d\log S + n), \text{ probability}: 0\left(\frac{d\log S + \log n}{|F|}\right)$$

Here, S refers to the number of gates forming the arithmetic operation circuit C.

The verifiable computing needs to be represented by an arithmetic operation circuit above the finite field. However, a large number of gates are required in order to represent the approximate computation as the circuit. This is because a large number of gates, which are proportional to the size of the finite field, are required to represent the rounding operation necessary for the approximate computation as the arithmetic operation gate.

In the disclosure, calculation verification of the arithmetic operation circuit is possible on the fine commutative ring.

Here, the finite commutative ring is an object without the condition that all elements must have an inverse to multiplication, as opposed to the finite field. For example, there may be polynomial ring $\mathbb{Z}_N[t]/(f(t))$, or the like, in which a modular arithmetic ring $\mathbb{Z}_N := \mathbb{Z}/N\mathbb{Z}$ for arbitrary natural number N is composed of polynomials having the elements of this ring as coefficients, and the addition or multiplication between the polynomials is defined as the remainder which is obtained by dividing the polynomial operation result by the given polynomial f, or the like.

In order to verify the arithmetic operation circuit described above in the finite commutative ring, the disclosure may enable the above-described operation by limiting the element in the random value arithmetic operation of the verifier.

To be specific, a random value may be extracted using a subset A satisfying the following with respect to the finite commutative ring R.

"For all the different elements x, y of A, x-y is not a zero divisor in R."

Here, the zero divisor refers to the number which is not zero, but becomes zero by being multiplied by the element other than zero. For example, p among the elements of $\mathbb{Z}_p^2$ becomes zero if p is multiplied by p and thus, it is the zero divisor.

Through this limitation, it is possible to verify the arithmetic operation circuit with respect to the finite commutative ring, but since the probability that the protocol is wrong is $$O\left(\frac{d\log S + \log n}{|A|}\right),$$

if the size of A is small, the protocol may not operate.

In order to improve the probability of being low, for the given finite commutative ring $\mathbb{Z}_p^e$, irreducible polynomial f(t) of $\mathbb{Z}_p[t]$ may be considered, and by using this, the polynomial ring $\mathbb{Z}_p^e[t]/(f(t))$ may be considered. The polynomial ring may be referred to as Galois ring.

The Galois ring may include the given finite commutative ring $\mathbb{Z}_p^e$, and A satisfying the condition above is as follows.

$$A := \{a_0 + a_1 t + \cdots + a_{d-1} t^{d-1} | a_i \in \{0, 1, 2, \cdots, p-1\}\} \quad \text{[Equation 19]}$$

Here, d refers to the degree of f(t).

Therefore, the size of A is $p^d$, and if the protocol is applied for the ring, the probability that the protocol would be wrong may be significantly lowered.

Figure 3:
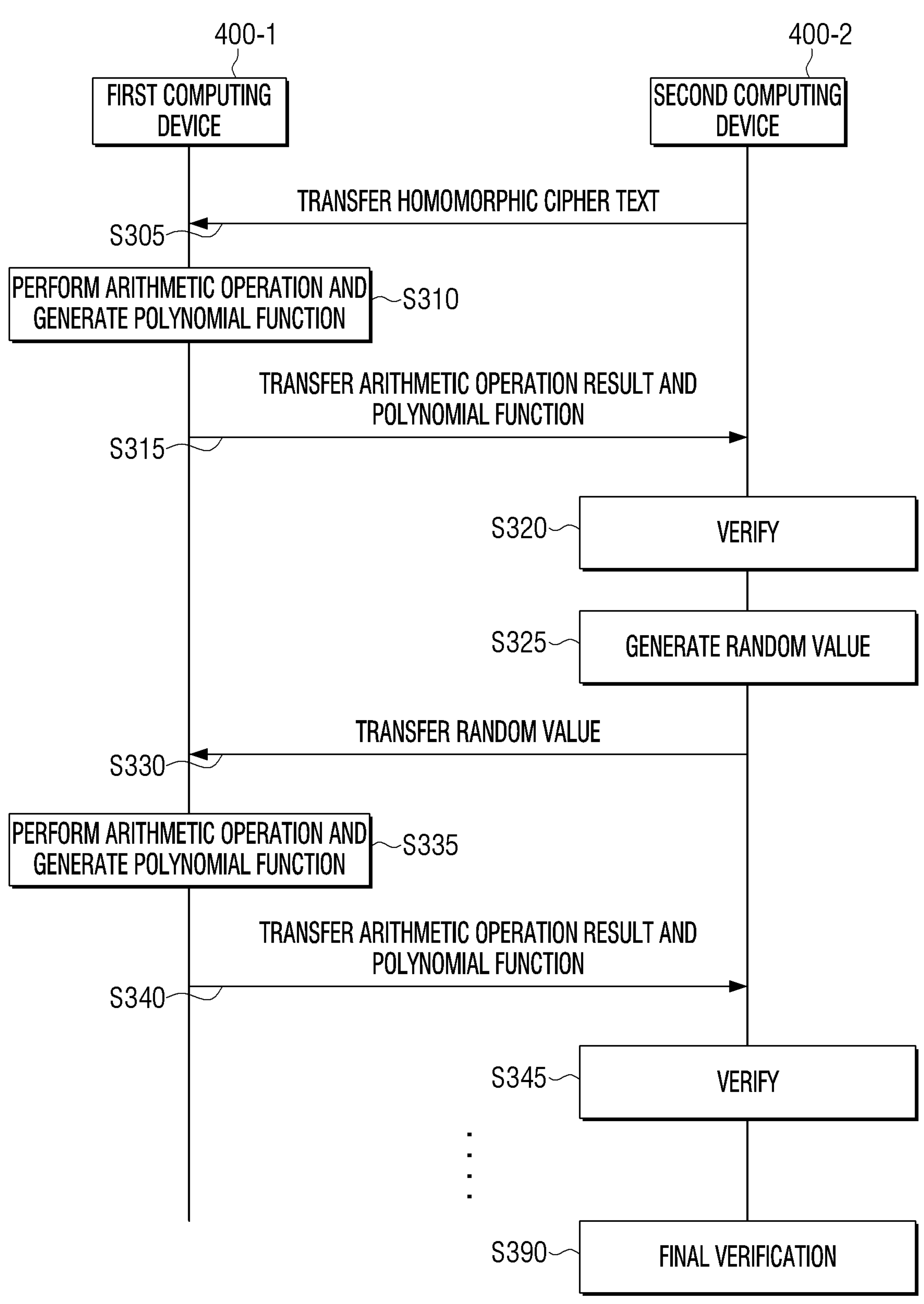
FIG. 3 is a sequence diagram illustrating an operation of verifiable computing of the disclosure.

FIG. 3 is a sequence diagram illustrating an operation of verifiable computing of the disclosure.

Referring to FIG. 3, a first computation apparatus 400-1 may operate as a prover. A second computation apparatus 400-2 may operate as a verifier. The first computation apparatus 400-1 may be a computing device with high performance than the second computation apparatus 400-2.

The second computation apparatus 400-2 may request an arithmetic operation for a logic circuit to the first computation apparatus 400-1 in operation S305. The second computation apparatus 400-2 may transfer only the required input value, and may transfer an input value and a logic circuit together. Here, the input value may be real data, such as a fixed-point, and may be a homomorphic ciphertext as described above.

The first computation apparatus 400-1 receiving the arithmetic operation request may perform an arithmetic operation reflecting the received input value to a predetermined logic circuit to generate an output homomorphic ciphertext. The first computation apparatus 400-1 may generate a first polynomial function for verifying the generated output value (or operation result) in operation S310.

When the output homomorphic ciphertext and the first polynomial function generation are completed, the first computation apparatus 400-1 may transfer the generated output value and the first polynomial function to the second computation apparatus 400-2 in operation S315.

The second computation apparatus 400-2 which received the first polynomial function may identify whether S=f1(0)+f1(1) by using the received first polynomial function in operation S320.

As a result of the check, if the result of the arithmetic operation described above is the same as that of the received output value, it is determined that the arithmetic operation in the first computation apparatus 400-1 is correct and the next operation may be performed. If it is determined that the result is not the same, the second computation apparatus 400-2 may not perform any further arithmetic operations.

When the operation result is verified, the second computation apparatus 400-2 may generate the number extracted randomly (i.e., a random value) on the finite field in operation S325 and may transfer the random value to the first computation apparatus 400-1 in operation S330.

The first computation apparatus 400-1 receiving the random value may generate the second polynomial function as described above in operation S335 as Equation 11 described above and may transfer the result to the second computation apparatus 400-2 in operation S340.

In operation S345, the second computation apparatus 400-2 receiving the second polynomial function may confirm that $f_{i-1}(r_{i-1})=f_i(0)+f_i(1)$ using the received second polynomial function. For example, if the result of the sum computation received as a result of the confirmation is different from the above-described arithmetic operation result, it may be determined that the arithmetic operation in the prover is incorrect.

In contrast, if the received sum computation result and the above-mentioned computation result are the same, the steps 325, 330, 350, and 345 described above may be repeated.

If the verification in all the steps described above is correct, it may be determined that the computation of the prover is correct in operation S390.

Figure 4:
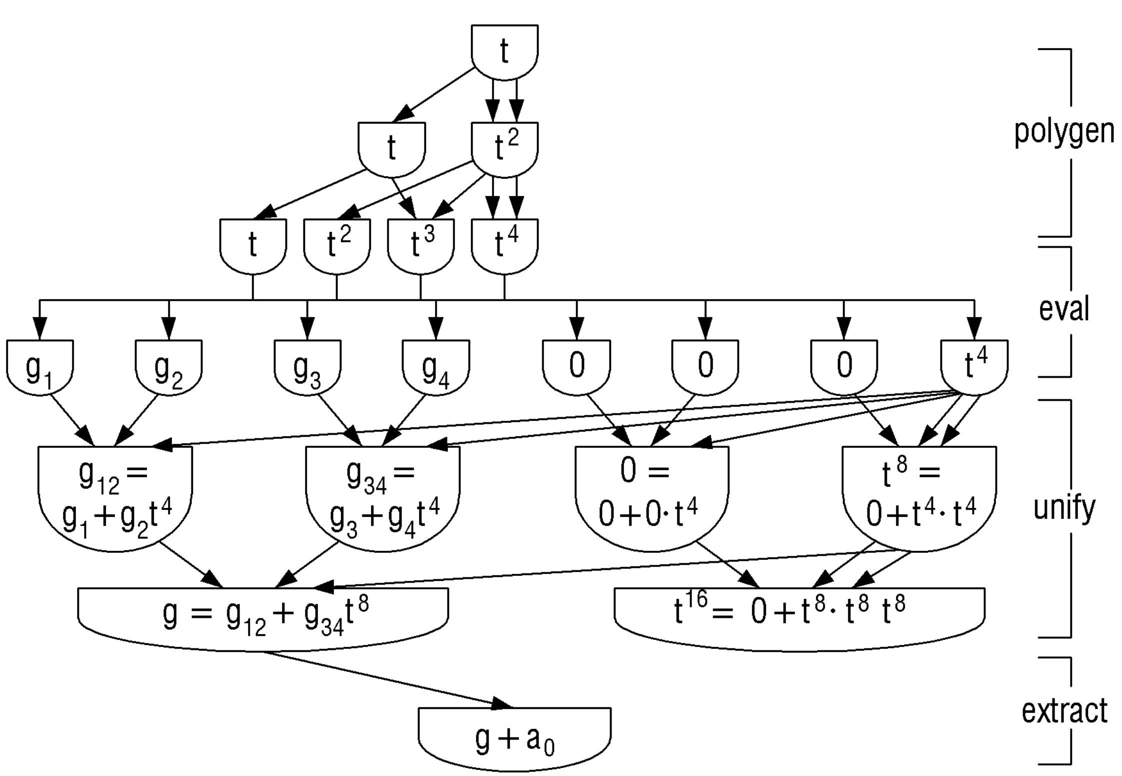
FIG. 4 is a diagram illustrating a design example of a logistic circuit of the disclosure.

FIG. 4 is a diagram illustrating a design example of a logistic circuit of the disclosure.

The arithmetic circuit may be composed of an addition gate and a multiplication gate, and each gate may receive two inputs and output an arithmetic operation result. If the $N^{th}$ polynomial g(t) is $$g(t) = \sum_{i=o}^{16} a_i t^i,$$

the arithmetic circuit may be configured to compute the $\sqrt{N}$ sub-polynomial first and then compute $$a_0 + \sum_{k=1}^{\sqrt{N}} g_k(t) \cdot t^{\sqrt{N}(k-1)}.$$

For example, if the $16^{th}$ polynomial is $g(t)=a_0+a_1t+ \ldots +a_{16}t^{16}$, the arithmetic circuit may perform the computation as below.

$$a_0 + \left(\left(a_1^t + \cdots + a_4^{t^4}\right) + \left(a_5^t + \cdots + a_8^{t^4}\right) \cdot t^4\right) + \left(a_9^t + \cdots + a_{12}^{t^4}\right) + \left(a_{13}^t + \cdots + a_{16}^{t^4}\right) \cdot t^4\right) \cdot t^8 \quad \text{[Equation 20]}$$

This polynomial is not required for all the powers of t, but may require only a portion such as t, t2, t4, t9, etc. Only the $\sqrt{N}$+ log $\sqrt{N}$ square for t may be required to compute g(t) at the time of evaluation. All of the sub-polynomials $g_k$ may be computed using the same small subset of the square of t, and this characteristic may reduce the circuit size and increase circuit regularity, thereby significantly reducing the cost of the prover during verifiable computing.

Referring to FIG. 4, an example of arithmetic circuit for $16^{th}$-degree polynomial is illustrated, and the arithmetic circuit may be composed of d layers.

The value of each gate represents the output of the gate, and the arrow represents the output wiring. The gate having a value of 0 is a dummy gate for achieving a regular wiring pattern, and this dummy gate does not affect the cost.

The logic circuit may include the division arithmetic computation.

When the elements $a_1p$, $a_2p$, $a_3p$, . . . , $a_np$, or the like, on $\mathbb{Z}_p{}^e$ are given, the logistic elements outputting the elements $a_1$, $a_2$, $a_3$, $a_n$ are assumed.

In this case, the multilinear extension $\tilde{V}$ made from the elements above $\mathbb{Z}_p{}^3$ and the multilinear extension $\tilde{V}'$ made from the elements above $\mathbb{Z}_p{}^{3-1}$ may satisfy the following relationship:

$$\tilde{V}(\vec{X}) = p\tilde{V}'(\vec{X}) \quad \text{[Equation 21]}$$

The verifier may convert the equation $\tilde{V}'(\vec{r})=z$ owned by the verifier into $\tilde{V}(\vec{r})=pz$.

The disclosure may perform an efficient rounding operation using the division p computation and the "lowest digit removal polynomial" described above.

For example, if the lowest digit removal polynomial is denoted as ldr(t), for a given finite commutative ring $\mathbb{Z}_p{}^e$, the ldr(t) is a polynomial satisfying the following condition, and the degree may be less than ep.

$$ldr(x) = x - (x \bmod p) \bmod p^e \quad \text{[Equation 22]}$$

The ldr(t) may serve to convert the remainder obtained by dividing t by p, or the lowest bit when expressed as p binary number to zero.

By using the ldr(t), the rounding off (represented as p binary number) operation described above may be represented as follows.

$$X \rightarrow \lfloor x/p^n \rfloor \quad \text{[Equation 23]}$$

The equation 23 above may be represented by performing the x→ldr (X)/p operation by n times. For example, if e=2, the ldr may be represented as:

$$ldr(x) = -x(x-1) \ldots (x-p+1) \quad \text{[Equation 24]}$$

Figure 5:
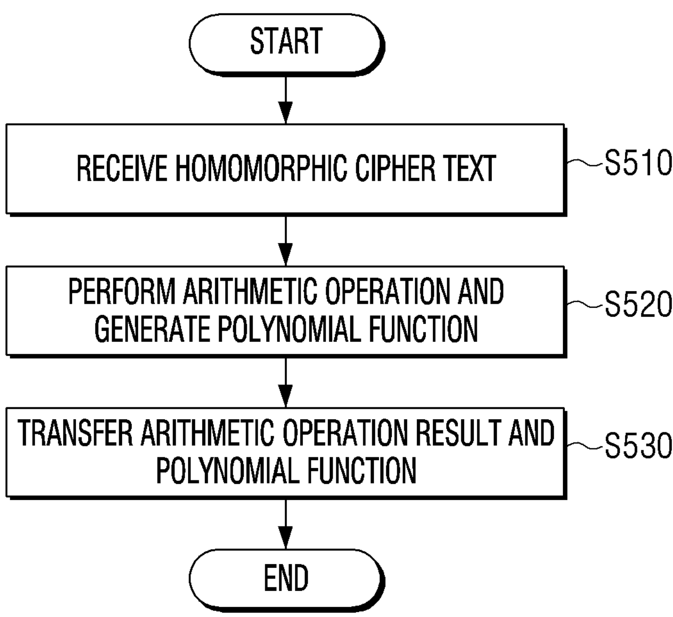
FIG. 5 is a flowchart illustrating a method of arithmetic operation of the disclosure.

FIG. 5 is a flowchart illustrating a method of arithmetic operation of the disclosure.

Referring to FIG. 5, an input value (e.g., a fixed point, a homomorphic ciphertext, etc.) may be received in operation S510. The homomorphic ciphertext may be a password satisfying the Equation 1 described above.

The output value and the first polynomial function for verifying the output value may be generated by reflecting the input value to the predetermined arithmetic circuit in operation S520. Specifically, if the above-described arithmetic circuit includes the approximate computation, it is possible to perform the arithmetic operations described above on the finite commutative ring. For the first polynomial function, the n-variable polynomial such as Equation 9 or multilinear extension function such as Equation 15 may be used. If the input value is a homomorphic ciphertext, the output value, which is a computation result, may be a homomorphic ciphertext.

The generated output value and the first polynomial function may be transferred to the external device in operation S530.

If it is determined that the verification using the polynomial function transferred during the implementation is determined to be correct, it is possible to additionally receive a random value, and generating an arithmetic value for the received random value and a second polynomial function for verifying the computation value, and training the generated computation value and the second polynomial function to an external device may be additionally performed. The operation of receiving the random value may be performed by a number of times corresponding to the number of variables of the n-variable polynomial used to generate the polynomial function.

Figure 6:
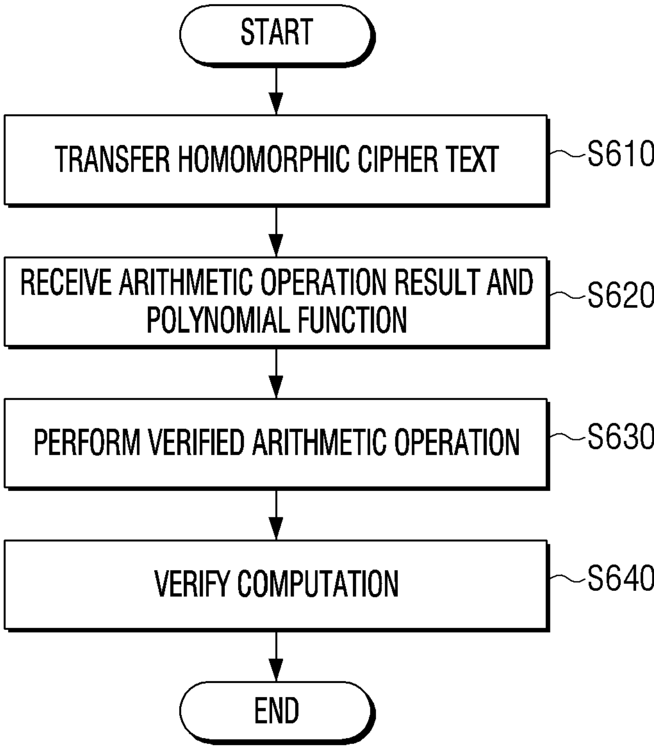
FIG. 6 is a flowchart illustrating a method of calculation verification according to the disclosure.

FIG. 6 is a flowchart illustrating a method of calculation verification according to the disclosure.

Referring to FIG. 6, an input value (e.g., a fixed point, a real number, a homomorphic text, etc.) may be transferred to an external device in operation S610.

The computation result and the polynomial function for the input value transferred in the predetermined arithmetic circuit may be received in operation S620. The arithmetic circuit may be a circuit composed of the addition gate or a multiplication gate, and may include a division operation, a rounding off operation, and the like.

The verification operation using the received polynomial function may be performed in operation S 630. Specifically, a value of t=0, t=1 may be input to the received polynomial function, and the operation of summing the computed two values (f1(0) and f1(1)) may be performed.

The operation by the external device may be verified by using the result of the verification operation performed and the received arithmetic operation result.

In implementation, a random value may be extracted from the finite commutative ring and the extracted random value is transferred to the external device, a polynomial function corresponding to the transferred random value may be received, and a verification operation for the received polynomial function may be additionally performed to perform the aforementioned verification.

At this time, the random value may be extracted from a subset of the finite commutative ring or Galois ring satisfying the condition that the difference between arbitrary two numbers is not a zero divisor.

Meanwhile, the method of encryption according to various embodiments described above may be implemented in the form of a program code for performing each step and may be stored in a recording medium and distributed. In this case, a device in which the recording medium is mounted may perform the operations such as encryption, ciphertext processing, or the like described above.

The recording medium may be various types of computer-readable mediums such as ROM, RAM, memory chip, memory card, external hard disk, hard disk, CD, DVD, magnetic disk, or magnetic tape.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

What is claimed is:

1. A method of an electronic apparatus for computation operation, the method comprising:

receiving an input value;

generating an input homomorphic ciphertext by homomorphically encrypting the input value with a public key such that the input homomorphic ciphertext will be decrypted with a secret key;

providing a preset arithmetic circuit on a finite commutative ring and a first polynomial function, wherein the preset arithmetic circuit is composed of a plurality of layers each of which comprises at least one of an addition gate and a multiplication gate, and the preset arithmetic circuit performs a modular computation operation, a polynomial operation to make a lower bit to zero, and a round-off operation using a division operation by using the plurality of layers including the at least one of the addition gate and the multiplication gate;

generating an output homomorphic ciphertext by reflecting the input homomorphic ciphertext to the preset arithmetic circuit and generating the first polynomial function to verify the output homomorphic ciphertext; and transferring the output homomorphic ciphertext and the first polynomial function to an external device that decrypts the output homomorphic ciphertext, performs a verification operation using the first polynomial function to generate a verified homomorphic ciphertext, and verifies an arithmetic operation using the verified homomorphic ciphertext and the output homomorphic ciphertext, wherein the electronic apparatus has higher performance capability than the external device.

2. The method of claim 1, further comprising:

receiving a random value randomly extracted from the finite commutative ring;

generating computation value for the random value and a second polynomial function to verify the computation value; and transferring the generated computation value and the second polynomial function to the external device.

3. The method of claim 2, wherein the finite commutative ring is a Galois ring.

4. The method of claim 2, wherein each of the generating the first polynomial function and the second polynomial function comprises generating a polynomial function by using an n-variable polynomial.

5. The method of claim 1, wherein the input homomorphic ciphertext is decrypted in a form satisfying a following formula:

$$Dec(ct,sk)=<ct,sk>=M+e(\mathrm{mod}\,q),$$

where <, >denotes a usual inner product, ct denotes the input homomorphic ciphertext, sk denotes the secret key, M denotes plaintext message, e denotes an encryption error value, and mod q denotes Modulus of the input homomorphic ciphertext.

6. The method of claim 1, wherein the finite commutative ring is a set of polynomials with predetermined coefficients and expressed by a following equation:

$$R=Z_q[x]/(f(x))$$

where R denotes a ring, Zq denotes a coefficient, and f(x) denotes a $n^{th}$ order polynomial.

7. The method of claim 1, wherein a multilinear extension $\tilde{V}_i(\tilde{x})$ made from an output value of a gate of $i^{th}$ layer among the layers is uniquely defined to satisfy a following equation:

$$\tilde{V}_i(\tilde{b})=\text{Output of the } b^{th} \text{ gate},$$

where $\tilde{b}\in\{0,1\}^n$ is an n-digit binary.

8. A method of an electronic apparatus for calculation verification, the method comprising:

transmitting an input value to an external device;

receiving an output homomorphic ciphertext generated by reflecting an input homomorphic ciphertext to a preset arithmetic circuit and receiving a first polynomial function to verify the output homomorphic ciphertext, wherein the input homomorphic ciphertext is generated by homomorphically encrypting the input value with a public key such that the input homomorphic ciphertext will be decrypted with a secret key, and the preset arithmetic circuit is provided on a finite commutative ring, wherein the preset arithmetic circuit is composed of a plurality of layers each of which comprises at least one of an addition gate and a multiplication gate, and the preset arithmetic circuit performs a modular computation operation, a polynomial operation to make a lower bit to zero, and a round-off operation using a division operation by using the plurality of layers including the at least one of the addition gate and the multiplication gate;

decrypting the output homomorphic ciphertext, performing a verification operation using the first polynomial function to generate a verified homomorphic ciphertext; and verifying an arithmetic operation by the external device using the verified homomorphic ciphertext and the output homomorphic ciphertext, wherein the external device has higher performance capability than the electronic apparatus.

9. The method of claim 8, further comprising:

extracting a random value from the finite commutative ring; and transferring the extracted random value to the external device.

10. The method of claim 9, wherein the extracting comprises extracting the random value from a set which is a subset of the finite commutative ring and in which a difference between two different numbers is not a zero divisor.

11. The method of claim 10, wherein the finite commutative ring is a Galois ring.

12. The method of claim 9, further comprising:

receiving a second polynomial function corresponding to the transferred random value, wherein the verifying the arithmetic operation by the external device comprises also using the second polynomial function corresponding to the random value.

13. A electronic apparatus, comprising:

a communication device to receive an input value;

a memory storing at least one instruction; and a processor to execute the at least one instruction, wherein the processor, by performing the at least one instruction, is to:

generate an input homomorphic ciphertext by homomorphically encrypting the input value with a public key such that the input homomorphic ciphertext will be decrypted with a secret key;

provide a preset arithmetic circuit on a finite commutative ring and a first polynomial function, wherein the preset arithmetic circuit is composed of a plurality of layers each of which comprises at least one of an addition gate and a multiplication gate, and the preset arithmetic circuit performs a modular computation operation, a polynomial operation to make a lower bit to zero, and a round-off operation using a division operation by using the plurality of layers including the at least one of the addition gate and the multiplication gate;

generate an output homomorphic ciphertext by reflecting the input homomorphic ciphertext to the preset arithmetic circuit and generate the first polynomial function to verify the output homomorphic ciphertext, and control the communication device to transfer the output homomorphic ciphertext and the first polynomial function to an external device that decrypts the output homomorphic ciphertext, performs a verification operation using the first polynomial function to generate a verified homomorphic ciphertext, and verifies an arithmetic operation using the verified homomorphic ciphertext and the output homomorphic ciphertext, and the electronic apparatus has higher performance capability than the external device.

14. The electronic apparatus of claim 13, wherein the processor:

based on receiving, from the external device, a random value extracted from the finite commutative ring, generates a computation value for the random value and a second polynomial function to verify the computation value, and controls the communication device to transfer the generated computation value and the second polynomial function to the external device.

15. The electronic apparatus of claim 14, wherein the processor generates the first polynomial function and the second polynomial function by using n-variable polynomial, and performs a verifiable computing operation as many as times corresponding to a number of variables of the n-variable polynomial.

16. An electronic computation apparatus, comprising:

a communication device to communicate with an external device, having a communication circuit;

a memory storing at least one instruction; and a processor to execute the at least one instruction, wherein the processor, by performing the at least one instruction, is to:

control the communication device to transfer an input value to the external device, receiving an output homomorphic ciphertext generated by reflecting an input homomorphic ciphertext to a preset arithmetic circuit and receiving a first polynomial function to verify the output homomorphic ciphertext, wherein the input homomorphic ciphertext is generated by homomorphically encrypting the input value with a public key such that the input homomorphic ciphertext will be decrypted with a secret key, and the preset arithmetic circuit is provided on a finite commutative ring, wherein the preset arithmetic circuit is composed of a plurality of layers each of which comprises at least one of an addition gate and a multiplication gate, and the preset arithmetic circuit performs a modular computation operation, a polynomial operation to make a lower bit to zero, and a round- off operation using a division operation by using the plurality of layers including the at least one of the addition gate and the multiplication gate, decrypt the output homomorphic ciphertext, perform a verification operation using the first polynomial function to generate a verified homomorphic ciphertext, and verify an arithmetic operation by the external device using the verified homomorphic ciphertext and the output homomorphic ciphertext, and the external device has higher performance capability than the electronic apparatus.

17. The electronic apparatus of claim 16, wherein the processor extracts a random value from the finite commutative ring and controls the communication device to transfer the extracted random value to the external device.

* * * * *